United States Patent
Hyun et al.

(10) Patent No.: US 10,347,933 B2
(45) Date of Patent: Jul. 9, 2019

(54) CATHODE ACTIVE MATERIAL FOR LITHIUM-ION SECONDARY BATTERY, MANUFACTURING METHOD THEREFOR AND LITHIUM-ION SECONDARY BATTERY COMPRISING SAME

(71) Applicant: Samsung SDI Co., Ltd., Yongin-si, Gyeonggi-do (KR)

(72) Inventors: Jang Suk Hyun, Daejeon (KR); Jin Young Kim, Daejeon (KR); Ki Tae Kim, Hwaseong-si (KR); Pil Sang Yun, Suwon-si (KR); Min Ah Cha, Suwon-si (KR); Sang Mi Kim, Incheon (KR); Hyun Beom Kim, Incheon (KR)

(73) Assignee: Samsung SDI Co., Ltd., Yongin-si (KR)

(*) Notice: Subject to any disclaimer, the term of this patent is extended or adjusted under 35 U.S.C. 154(b) by 35 days.

(21) Appl. No.: 15/540,532

(22) PCT Filed: Aug. 21, 2015

(86) PCT No.: PCT/KR2015/008734
§ 371 (c)(1),
(2) Date: Aug. 21, 2017

(87) PCT Pub. No.: WO2016/108386
PCT Pub. Date: Jul. 7, 2016

(65) Prior Publication Data
US 2018/0006325 A1    Jan. 4, 2018

(30) Foreign Application Priority Data
Dec. 31, 2014 (KR) .................... 10-2014-0195757

(51) Int. Cl.
H01M 4/505 (2010.01)
H01M 10/052 (2010.01)
(Continued)

(52) U.S. Cl.
CPC ........ *H01M 10/052* (2013.01); *C01G 53/006* (2013.01); *C01G 53/50* (2013.01);
(Continued)

(58) Field of Classification Search
CPC .. H01M 10/052; H01M 4/04; H01M 10/0525; H01M 4/525; H01M 4/505;
(Continued)

(56) References Cited

U.S. PATENT DOCUMENTS

2010/0294985 A1   11/2010  Suhara et al.
2012/0156560 A1   6/2012   Hong et al.
(Continued)

FOREIGN PATENT DOCUMENTS

JP     2000-82466 A     3/2000
JP     2004-119218 A    4/2004
(Continued)

*Primary Examiner* — Cynthia K Walls
(74) *Attorney, Agent, or Firm* — Lewis Roca Rothgerber Christie LLP

(57) ABSTRACT

A cathode active material for a lithium secondary battery includes lithium transition metal oxide particles, wherein the lithium transition metal oxide particles may include first lithium transition metal oxide particles (first particles) including an interparticular pore and second lithium transition metal oxide particles (second particles) having an average particle diameter within a range of a diameter of the interparticular pore, measured by mercury intrusion porosimetry. By including first particles including an interparticular pore and second particles having an average particle diameter within a range of a diameter of the interparticular pore measured by mercury intrusion porosimetry, the cathode active material may have a reduced interparticular pore present therein. Accordingly, the cathode active material may have an improved pellet density. Consequently, when a
(Continued)

lithium secondary battery is manufactured using the cathode active material, the energy density thereof may improve.

8 Claims, 3 Drawing Sheets

(51) Int. Cl.
*H01M 4/525* (2010.01)
*H01M 4/04* (2006.01)
*C01G 53/00* (2006.01)
*H01M 10/0525* (2010.01)
*H01M 4/02* (2006.01)

(52) U.S. Cl.
CPC .............. *H01M 4/04* (2013.01); *H01M 4/505* (2013.01); *H01M 4/525* (2013.01); *H01M 10/0525* (2013.01); *C01P 2004/03* (2013.01); *C01P 2004/61* (2013.01); *C01P 2006/10* (2013.01); *H01M 2004/028* (2013.01)

(58) Field of Classification Search
CPC ........... H01M 2004/028; C01G 53/006; C01G 53/50; C01P 2004/61; C01P 2004/03; C01P 2006/10
See application file for complete search history.

(56) References Cited

U.S. PATENT DOCUMENTS

2012/0295157 A1  11/2012  Nagai et al.
2013/0295456 A1  11/2013  Nagai et al.
2014/0329126 A1  11/2014  Ho et al.

FOREIGN PATENT DOCUMENTS

| JP | 2010-70427 A | 4/2010 |
| KR | 10-2010-0131921 A | 12/2010 |
| KR | 10-2012-0105056 A | 9/2012 |
| KR | 10-2014-0125381 A | 10/2014 |
| WO | WO 2012/063369 A1 | 5/2012 |

CATHODE ACTIVE MATERIAL FOR LITHIUM-ION SECONDARY BATTERY, MANUFACTURING METHOD THEREFOR AND LITHIUM-ION SECONDARY BATTERY COMPRISING SAME

CROSS-REFERENCE TO RELATED APPLICATION(S)

This application is a National Phase Patent Application of International Patent Application Number PCT/KR2015/008734, filed on Aug. 21, 2015, which claims priority of Korean Patent Application 10-2014-0195757, filed Dec. 31, 2014. The entire contents of both of which are incorporated herein by reference.

TECHNICAL FIELD

The present invention relates to a cathode active material for a lithium ion secondary battery, a method of preparing the same, and a lithium ion secondary battery including the same, and more particularly, to a cathode active material for a lithium ion secondary battery, a method of preparing the same, and a lithium ion secondary battery including the same, in which an interparticular pore between lithium transition metal oxide particles may be actually measured by mercury intrusion porosimetry, and lithium transition metal oxide particles having an average particle diameter within a range of a diameter of the pore may be further included, thereby reducing the interparticular pore, which results in increased pellet density and energy density per volume.

BACKGROUND ART

Electronic and information communication industries are rapidly growing through the development of portable, miniaturized, lightweight, and highly efficient electronic devices, and demand for lithium secondary batteries capable of realizing large capacity and excellent performance as power sources of these electronic devices is rapidly increasing. Further, as electric vehicles (EVs) and hybrid electric vehicles (HEVs) have been put to practical use, research into lithium secondary batteries having large capacity, excellent output, and high stability has been actively conducted.

A lithium secondary battery is used by injecting an electrolyte solution into a battery cell including a cathode including a cathode active material capable of intercalation and deintercalation of lithium and an anode including an anode active material capable of intercalation and deintercalation of lithium.

Among the components of such a lithium secondary battery, the cathode active material plays an important role in determining the capacity and performance of the battery.

Recently, since energy consumption of mobile devices has been increasing due to the multifunctionality of mobile devices, and further, as the application to the field of environment-friendly electric vehicles has expanded, development of a cathode active material having high energy density has been demanded.

Conventionally, as a method of increasing the energy density of a cathode active material, a method of mixing particles having different sizes in various ratios has been used to increase a volume capacity density, a filling density, or a tapped density of the cathode active material.

For example, Patent Document 1 (Japanese Patent Application Laid-Open No. 2000-082466) discloses a cathode active material in which lithium cobalt composite oxide particles have an average particle diameter in a range of 0.1 micrometers ($\mu$m) to 50 $\mu$m, and two peaks are found in a particle distribution. According to the above method, the filling density of the cathode active material particles may improve.

Patent Document 2 (Japanese Patent Application Laid-Open No. 2004-119218) discloses mixing a cathode active material having an average particle diameter of 7 $\mu$m to 20 $\mu$m with a cathode active material having an average particle diameter of 10 percent (%) to 30% of the foregoing cathode active material so as to improve the volume capacity density of the cathode active material.

Patent Document 3 (Korean Patent Application Pub. No. 10-2010-0131921) discloses a cathode active material having an improved filling density by including a small-diameter active material having an average particle diameter of 0.5 $\mu$m and a maximum particle diameter of less than 1 $\mu$m, and a large-diameter active material having an average particle diameter of 5 $\mu$m to 20 $\mu$m and a maximum particle diameter of 100 $\mu$m.

However, the prior art relies on empirical observations or repetitive experimentation to improve the density of particles by simply mixing particles of various sizes. According to the above methods, the density of a portion of particles may improve limitedly, and it is not possible to recognize as to whether the improved density value is due to the particles itself or due to the particle size distribution of the cathode active material. Thus, it is difficult to recognize the physical property controlling factor.

Accordingly, in the present invention, a size and a volume of interparticular pores are quantified to realize a cathode active material having a high energy density.

PRIOR ART DOCUMENTS

Patent Documents (Patent Document 1) JP 2000-082466 A
(Patent Document 2) JP 2004-119218 A
(Patent Document 3) KR 2010-0131921 A

DETAILED DESCRIPTION OF THE INVENTION

Technical Problem

The present invention provides a cathode active material for a lithium secondary battery, the cathode active material having a high density, in which an interparticular pore between lithium transition metal particles may be actually measured by mercury intrusion porosimetry, and lithium transition metal particles having an average particle diameter within a range of a diameter of the pore may be further included.

The present invention provides a method of preparing the cathode active material, and a lithium secondary battery.

Technical Solution

According to one or more embodiments, a cathode active material includes first lithium transition metal oxide particles (hereinafter, referred as "first particles") including an interparticular pore and second lithium transition metal oxide particles (hereinafter, referred as "second particles") having an average particle diameter within a range of a diameter of the interparticular pore, measured by mercury intrusion porosimetry.

An average diameter of an interparticular pore of the first particles may be preferably 0.5 micrometers (μm) or greater and 15 μm or less, an average diameter of an interparticular pore of the cathode active material including the first particles and the second particles may be preferably 0.3 μm to or greater and 8 μm or less, and an average particle diameter of the first particles may be preferably 1 μm or greater and 30 μm or less.

A pellet density of the thus produced cathode active material may be 3.1 (grams per cubic centimeter) g/cc to 3.7 g/cc.

Preferably, the lithium transition metal oxide may be represented by Formula 1:

$$Li_{1+a}Ni_xM1_yM2_zO_2 \quad \text{Formula 1}$$

wherein, in Formula 1, $0<a\leq0.2$, $x+y+z=1$, M1 may be at least one selected from Co and Mn, and M2 may be at least one selected from F, Mg, Al, Si, Ti, V, Cr, Mn, Fe, Cu, Zn, Zr, Nb, and Mo or may not exist.

According to one or more embodiments, a method of preparing a cathode active material includes preparing first lithium transition metal oxide particles (first particles) including an interparticular pore; measuring the interparticular pore between the first particles by mercury intrusion porosimetry; preparing second lithium transition metal oxide particles (second particles) having an average particle diameter within a range of a diameter of the interparticular pore; and mixing the first particles with the second particles.

According to one or more embodiments, a lithium secondary battery includes the cathode active material.

Advantageous Effects of the Invention

According to one or more embodiments, a cathode active material may include first particles including an interparticular pore and second particles having an average particle diameter within a range of a diameter of the interparticular pore measured by mercury intrusion porosimetry. Thus, the cathode active material may have a reduced interparticular pore present therein. Accordingly, the cathode active material may have an improved pellet density.

Therefore, a lithium secondary battery including the cathode active material may have high energy density.

BEST MODE

The present invention relates to a cathode active material for a lithium secondary battery including lithium transition metal oxide particles, wherein the lithium transition metal oxide particles may include first particles including an interparticular pore and second particles having an average particle diameter within a range of a diameter of the interparticular pore, measured by mercury intrusion porosimetry.

Figure 1:
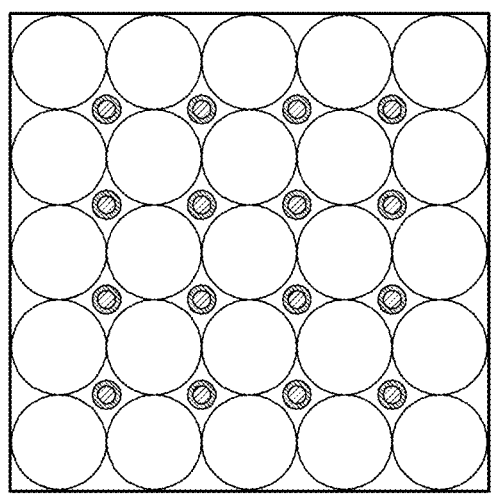
FIG. 1 is a schematic view of a cathode active material according to an embodiment of the present invention.

The inventors of the present invention manufactured a cathode active material having high density by quantifying the diameter of an interparticular pore of a cathode active material by mercury intrusion porosimetry and further including the second particles having an average particle diameter within a range of a diameter of the interparticular pore therein, thereby completing the present invention. Here, the term "interparticular pore" refers to an empty space between particles included in a cathode active material. FIG. 1 schematically illustrates a cathode active material including blue-colored second particles present in the interparticular pores between the orange-colored first particles. Each of the first particles and the second particles are aggregates (secondary particle) formed by aggregation of a plurality of primary particles, and the interparticular pores represents pores between the aggregates (secondary particles).

Mercury intrusion porosimetry utilizes the characteristic of mercury that does not wet solids to measure the total volume of all the pores, the size or distribution of the pores, and the surface area of the pores, by intruding mercury into pores of a sample by applying external pressure thereto. The mercury intrusion porosimetry may be performed using a mercury porosimeter.

The average diameter of the interparticular pore of the first particles measured by mercury intrusion porosimetry may be, preferably 0.5 micrometers (μm) or greater and 15 μm an or less. A pore diameter may be calculated by the following Equation 1.

$$D_P = \frac{-2\gamma\cos\theta}{P} \quad \text{Equation 1}$$

In Equation 1, "$D_P$" indicates a pore diameter, "P" indicates a pressure, "θ" indicates a mercury contact angle, and "γ" indicates a surface tension.

An average diameter of the pore represents a volume average value obtained in a distribution of the pore diameters obtained as described above (i.e., a pore diameter or median diameter corresponding to 50% of accumulated volumes).

When an average diameter of the pore is less than 0.5 μm, the cathode active material may have a decreased ion conductivity and deteriorated rate characteristics. In contrast, when an average diameter of the pore is greater than 15 μm, the cathode active material may have a decreased energy density.

An average diameter of an interparticular pore in the cathode active material including the first and second particles may be 0.5 μm to or greater and 15 μm or less. An average diameter of an interparticular pore may be reduced to 0.3 μm or greater and 8 μm or less at the maximum. This is because the size of an interparticular pore of the first particles is quantified, and the second particles are included therein, which enables precise control of a pore size. Thus, the pore of the cathode active material may be minimized.

An average particle diameter of the first particles may be preferably 1 μm or greater and 30 μm or less. When the average particle diameter is less than 1 μm, the specific surface area of the cathode active material may increase, which may result in an increased amount of a binder for maintaining desired electrode binding force or a problem during the process due to fine dust. In contrast, when the average particle diameter is greater than 30 µm, the specific surface area of the cathode active material may decrease, which may result in a decreased output. Here, an average particle diameter represents a measured volume average value, D50, obtained in a size distribution measurement by a laser diffraction method (i.e., a pore diameter or median diameter corresponding to 50% of accumulated volumes).

A true density of the cathode active material measured by a gas displacement-type pycnometer may be 0.5 (grams per cubic centimeter) g/cc or greater and 5.5 g/cc or less. When the true density is less than 0.5 g/cc, an energy density of the cathode active material may decrease, and in contrast, when the true density is greater than 5.5 g/cc, output characteristics may decrease.

Equations for mixing the first particles with the second particles may be represented as follows.

$$\rho' = \frac{\frac{4}{3}\pi\left(\frac{D}{2}\right)^3 \cdot N \cdot \rho}{\frac{4}{3}\pi\left(\frac{D}{2}\right)^3 \cdot N + V_{inter}} \qquad \text{Equation 2}$$

$$\frac{4}{3}\pi\left(\frac{d}{2}\right)^3 \cdot n \sim V_{inter} \qquad \text{Equation 3}$$

In Equation 2, "ρ'" indicates a powder density of the cathode active material, "ρ" indicates a true density of the cathode active material, "D" indicates an average diameter of the first particles, "N" indicates the number of the first particles, and "$V_{inter}$" indicates a volume of interparticular pores. In Equation 3, "d" indicates an average diameter of the second particles, and "n" indicates the number of the second particles. That is, when the second particles having the most similar volume as the interparticular pore are mixed, the powder density may be the highest.

The lithium transition metal oxide according to the present invention may be at least one selected from the group consisting of lithium manganese oxide, lithium cobalt oxide, lithium nickel oxide, lithium manganese cobalt oxide, lithium manganese nickel oxide, lithium cobalt nickel oxide, and lithium manganese cobalt nickel oxide, and more preferably, the lithium transition metal oxide may be represented by Formula 1.

$Li_{1+a}Ni_xM1_yM2_zO_2$      Formula 1 wherein, in Formula 1, 0<a≤0.2, x+y+z=1, M1 may be at least one selected from Co and Mn, and M2 may at least one selected from F, Mg, Al, Si, Ti, V, Cr, Mn, Fe, Cu, Zn, Zr, Nb, and Mo or may not exist.

In addition, the present invention provides a method of preparing a cathode active material including lithium transition metal oxide particles. In detail, the method of preparing may include preparing first lithium transition metal oxide particles (first particles) including an interparticular pore; measuring the interparticular pore between the first particles by mercury intrusion porosimetry; preparing second lithium transition metal oxide particles (second particles) having an average particle diameter within a range of a diameter of the interparticular pore; and mixing the first particles with the second particles.

Upon preparing the first particles, the first particles may be prepared by using a batch reactor or a conventional cathode active material product may be used. The method of preparing is not particularly limited.

The preparing of the second particles may include preparing an active material precursor by using a batch reactor and mixing and calcining the prepared precursor and a lithium precursor to prepare a cathode active material.

When a batch reactor is used as described above, a portion of a reactant may previously be introduced into the reactor to control reaction heat and the concentration of the reactant, and then a reaction may be performed while stirring with the addition of other components thereto. A batch reactor has a raw material inlet capable of continuously supplying a raw material as a reaction progresses, and the product is recovered once the reaction is complete. Therefore, in a batch reactor, since reaction conditions such as a concentration, a temperature, and a residual time of an reactants are the same, uniform products without deviation may be economically produced.

The thus produced cathode active material may have a pellet density of 3.1 g/cc or greater and 3.7 g/cc or less. When a cathode active material has a pellet density within this range, the energy density thereof may be preferably high.

According to one or more embodiments, a lithium secondary battery includes the cathode active material. The lithium secondary battery may include a cathode including the cathode active material, an anode including an anode active material, a separator, and a nonaqueous electrolyte solution. The structure and the method of manufacturing the lithium secondary battery are known in the art to which the present invention pertains and may be appropriately selected without departing from the scope of the present invention.

For example, the cathode may be manufactured by coating a cathode current collector with a composition for forming a cathode active material including the cathode active material according to the present invention and a binder, followed by drying and roll-pressing.

The binder binds the cathode active materials and fixes the cathode active materials on a current collector. Any binder used in the art may be used without limitation. Preferably, the binder may be at least one selected from polyvinylidene fluoride, polytetrafluoroethylene, polyvinylchloride, polyvinyl pyrrolidone, polyvinyl alcohol, carboxymethyl cellulose (CMC), starch, hydroxypropyl cellulose, polyethylene, polypropylene, styrene-butylene rubber, and fluorine rubber.

The composition for forming a cathode active material may be prepared by optionally adding a solvent, such as N-methyl-2-pyrrolidone (NMP), and a filler including a fibrous material, such as glass fiber or carbon fiber, or an olefin-based polymer, e.g., polyethylene or polypropylene, in addition to a cathode active material and a binder. In addition, the composition may further include a conductive agent known in the art, e.g., hard carbon, graphite, carbon fiber, or the like.

The cathode current collector is not particularly limited, and may be any material as long as the cathode current collector has excellent electrical conductivity without causing a chemical change in a battery. Examples of the cathode current collector may include copper, stainless steel, aluminum, nickel, titanium, and sintered carbon; copper or stainless steel, the copper and the stainless steel each being surface-treated with carbon, nickel, titanium, or silver; and an aluminum-cadmium alloy. The cathode current collector may be used in any of various forms including a film, a sheet, a foil, a net, a porous structure, a foam, and a non-woven fabric.

The anode may be manufactured by coating an anode current collector with a composition for forming an anode active material including an anode active material, followed by drying and roll-pressing. The anode may also be lithium metal. The composition for forming an anode active material may optionally further include the binder and a conductive agent.

The anode active material may be a carbonaceous material, such as artificial graphite, natural graphite, a graphitized carbon fiber, or amorphous carbon, an alloyable metallic compound with lithium, e.g., silicon (Si), aluminum (Al), tin (Sn), lead (Pb), zinc (Zn), bismuth (Bi), indium (In), manganese (Mg), gallium (Ga), cadmium (Cd), silicon alloy, tin alloy, or aluminum alloy, and a composite of the metallic compound and the carbonaceous material.

The anode current collector is not particularly limited, and may be any material as long as the anode current collector has excellent electrical conductivity without causing a chemical change in a battery. Examples of the anode current collector may include copper, stainless steel, aluminum, nickel, titanium, and sintered carbon; copper or stainless steel, the copper and the stainless steel each being surface-treated with carbon, nickel, titanium, or silver; and an aluminum-cadmium alloy. The cathode current collector may be used in any of various forms including a film, a sheet, a foil, a net, a porous structure, a foam, and a non-woven fabric.

The separator may be disposed between an anode and a cathode, and may be a common porous polymer film used as a conventional separator, for example, a porous polymer film prepared from a polyolefin-based polymer, e.g., an ethylene homopolymer, a propylene homopolymer, an ethylene/butene copolymer, an ethylene/hexene copolymer, and an ethylene/methacrylate copolymer, the porous polymer film being used alone or as a laminate. Further, a non-woven fabric prepared from a conventional porous non-woven fabric, e.g., a glass fiber having a high melting point or a polyethylene terephthalate fiber, may be used.

The nonaqueous electrolyte solution may include an electrolyte solution and a lithium salt. A nonaqueous organic solvent, an organic solid electrolyte, or an inorganic solid electrolyte may be used as the electrolyte solution, but embodiments are not limited thereto.

Examples of the nonaqueous organic solvent may be an aprotic organic solvent, such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, triester phosphate, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may include a polyethylene derivative, a polyethylene oxide derivative, a polypropylene oxide derivative, a phosphoric ester polymer, poly agitation lysine, a polyester sulfide, a polyvinyl alcohol, PVDF, and a polymer including a dissociable ionic group.

Examples of the inorganic solid electrolyte include a lithium nitrides, halides and sulfates, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt easily dissolves in the nonaqueous electrolyte, and examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, a lower aliphatic carboxylic acid lithium, lithium tetraphenylborate, and imide.

The secondary battery may be classified as a coin type, a rectangular type, a cylindrical type, or a pouch type. The structure and methods of manufacturing a battery are widely known in the art and thus a detailed description thereof is omitted.

The present invention will now be described in greater detail with reference to the following examples. However, the following examples shall not limit the scope of the present disclosure.

Example 1

A NaOH and $NH_4OH$ aqueous solution (mother liquid) was added to a self-produced batch reactor (having a capacity of 10 liters (L) and a stirring speed of the rotating motor of 800 rotations per minute (rpm)) to adjust a pH to 11. An aqueous solution, in which three raw materials were dissolved (at a molar ratio of 5:2:3), the three raw materials being 1 M $NiSO_4.6H_2O$, $CoSO_4.7H_2O$, and $MnSO_4.H_2O$; a NaOH aqueous solution; and a $NH_4OH$ aqueous solution were each prepared, and then, injected to a raw material tank.

Next, from the raw material tank, the raw material aqueous solution, the NaOH aqueous solution, and the $NH_4OH$ aqueous solution were injected to the reactor, in which the mother liquid was being stirred, at a rate of 1 milliliter per minute (mL/min). The mixture was allowed to react while maintaining the pH and stirring at a temperature of 50□ for 3 hours. The resultant slurry was dried using a nozzle-type spray dryer. The pressure of the nozzle was 5 kilogram-force per square centimeter ($kgf/cm^2$). The dried Ni, Co, and manganese oxide powder were mixed with $Li_2CO_3$ in an oxidation furnace in an air atmosphere (in which the molar ratio of $Li_2CO_3$ to Ni, Co, and manganese oxide was 1.03:1.00), and then heat-treated at 850□ for 4 hours to thereby obtain first particles having an average particle diameter (D50) of 12 μm. Here, an average particle diameter (D50) represents a measured volume average value obtained in a size distribution measurement by a laser diffraction method (i.e., a pore diameter or median diameter corresponding to 50% of accumulated volumes).

Next, a size of the interparticular pore between the first particles was measured by using a mercury porosimeter (Poremaster 60GT: available from Quantachrom Inc.). The average diameter of the pore was found to be 3 μm.

Next, second particles having an average particle diameter (D50) of 3 μm were prepared in the same manner as in the preparation of the first particles, except that the stirring speed of the batch reactor was 1,200 rpm for 20 hours at 30° C. at a pH of 12.

The thus produced first particles and second particles were mixed together to prepare a cathode active material.

Comparative Example 1

The first particles prepared in Example 1 were prepared as a cathode active material.
<Measurement Method>
1. True Density
True density was measured by a helium gas pycnometer method using pycnometer (AccuPyc II 1340: available from Micromeritics, Co., Ltd.).

2. Pellet Density 1 g of a cathode active material was added to a circular mold having a diameter of 1 centimeter (cm), and then a pressure of 1,000 kgf/cm² was applied thereto to obtain a pellet-type cathode active material. The density, i.e., the mass per volume, of the pellet-type cathode active material was measured.

3. Basic Capacity

Each of the cathode active material of Example 1 and the cathode active material of Comparative Example 1, Denka Black, i.e., a conductive agent, polyvinylidene fluoride (PVDF), i.e., a binder, were mixed together at a weight ratio of 93:3.5:3.5 to prepare a slurry. The slurry was coated on an aluminum (Al) foil using a doctor blade to manufacture a cathode electrode plate.

As an anode, lithium metal available from Aldrich Co., Ltd. was used, as a separator, porous polyethylene was used, and as an electrolyte, a solution, in which 1.0 M $LiPF_6$ ethylene carbonate (EC):dimethyl carbonate (DMC):EC were mixed at a weight ratio of 6:2:2, was used, to thereby manufacture a coin-cell type lithium secondary battery.

The manufactured coin-cell was left at a constant temperature of 25□ for 20 hours, and then charged and discharged using a lithium secondary battery charge and discharge tester (Toscat 3100 available from Toyo Corporation), where a voltage of the test cell was set to a range of 3.0 Volts (V) to 4.3V, at 0.2 C in a constant current (CC)/constant voltage (CV) mode.

4. Interparticular Pore Distribution

Figure 2:
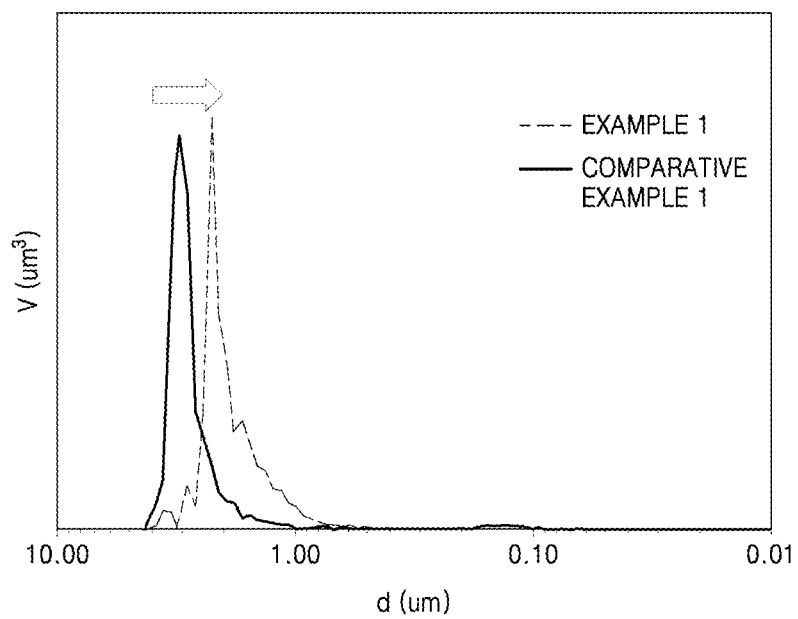
FIG. 2 is a comparative graph of volume distribution versus a diameter of an interparticular pore of cathode active materials prepared in Example 1 and Comparative Example 1, measured by mercury intrusion porosimetry.
Figure 3:
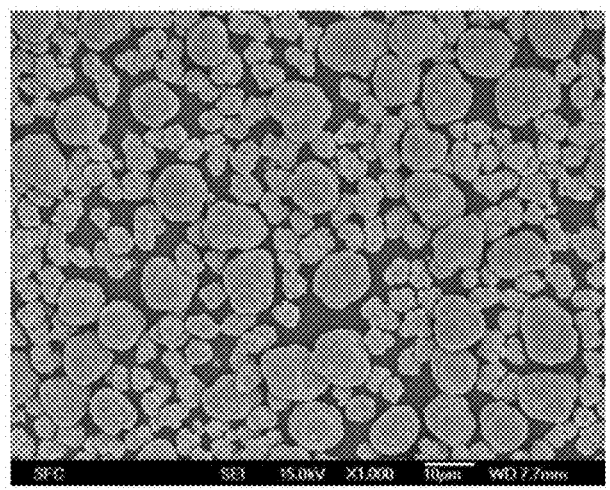
FIG. 3 is a scanning electron microscope (SEM) image of a cathode active material prepared in Example 1.
Figure 4:
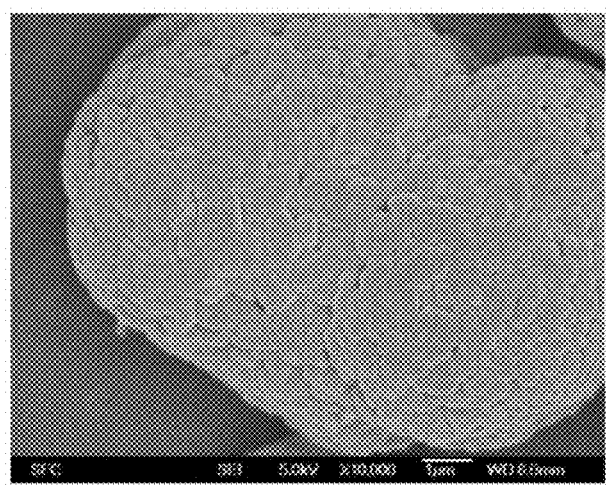
FIG. 4 is an enlarged SEM image of the cathode active material of FIG. 3, focusing on a first particle included therein.
Figure 5:
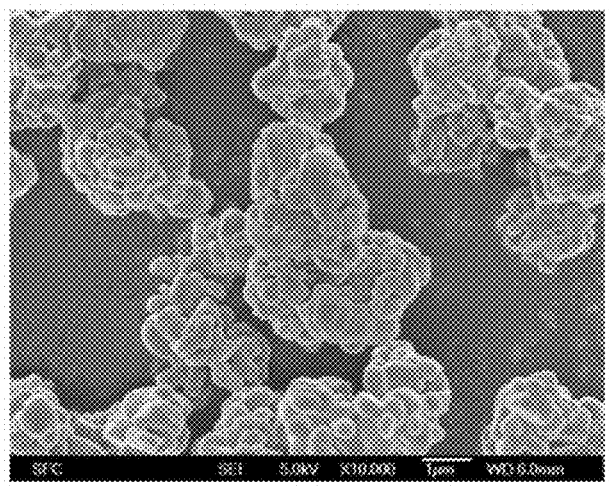
FIG. 5 is an enlarged SEM image of the cathode active material of FIG. 3, focusing on a second particle included therein.

The pore diameters of the cathode active materials prepared in Example 1 and Comparative Example 1 were measured using a mercury porosimeter (Poremaster 60GT: available from Quantachrome Inc.). The comparison of volume distribution versus the pore diameter is shown in FIG. 2.

TABLE 1

| | True density (g/cc) | | Basic capacity (mAh/g) | Pellet density (g/cc) Pellet density (g/cc) | Energy density per volume (mAh/cc) Energy density per volume (mAh/cc) |
|---|---|---|---|---|---|
| | First particle | Second particle | cathode active material | | |
| Example 1 | 4.68 | 4.65 | 4.67 | 165 | 3.3 | 544.5 |
| Comparative Example 1 | 4.68 | — | 4.68 | 164 | 2.9 | 475.6 |

Referring to the results of Table 1, the cathode active material prepared in Example 1 was found to have a true density and a basic capacity in a similar level as the cathode active material prepared in Comparative Example 1. However, a pellet density and an energy density per volume of the cathode active material prepared in Example 1 were found to be improved, as compared with the cathode active material prepared in Comparative Example 1. In addition, the cathode active material of Example 1 was found to have a significantly decreased volume per unit weight, which means that the pore inside the cathode active material was significantly reduced.

Furthermore, referring to FIG. 2, it was found that those having smaller diameters of the interparticular pore occupied a larger volume in the cathode active material of Example 1, as compared with the cathode active material of Comparative Example 1 that does not include a second particle having an average particle diameter of 3 μm.

Accordingly, considering the whole cathode active material, the average pore diameter was found to be decreased by 1.8 μm.

The embodiments of the present invention described above are not intended to limit the spirit of the present invention. The scope of the present invention should be construed according to the following claims, and the spirit within the scope of the claims should be construed as being included in the scope of the present invention.

The invention claimed is:

1. A cathode active material for a lithium secondary battery, comprising lithium transition metal oxide particles, wherein the lithium transition metal oxide particles comprise first lithium transition metal oxide particles (first particles) comprising an interparticular pore and second lithium transition metal oxide particles (second particles) having an average particle diameter within a range of a diameter of the interparticular pore, measured by mercury intrusion porosimetry.

2. The cathode active material of claim 1, wherein an average diameter of the interparticular pore of the first particles is 0.5 micrometers (μm) or greater and 15 μm or less.

3. The cathode active material of claim 1, wherein an average diameter of an interparticular pore of the cathode active material comprising the first and second particles is 0.3 μm or greater and 8 μm or less.

4. The cathode active material of claim 1, wherein an average particle diameter of the first particles is 1 μm or greater and 30 μm or less.

5. The cathode active material of claim 1, wherein a pellet density of the cathode active material is 3.1 grams per cubic centimeters (g/cc) to 3.7 g/cc.

6. The cathode active material of claim 1, wherein the lithium transition metal oxides are represented by Formula 1:

$$Li_{1+a}Ni_xM1_yM2_zO_2 \quad \text{Formula 1}$$

wherein, in Formula 1, 0<a≤0.2, x+y+z=1, M1 is at least one selected from Co and Mn, and M2 is at least one selected from F, Mg, Al, Si, Ti, V, Cr, Mn, Fe, Cu, Zn, Zr, Nb, and Mo or does not exist.

7. A method of preparing a cathode active material comprising lithium transition metal oxide particles, the method comprising:

preparing first lithium transition metal oxide particles (first particles) comprising an interparticular pore;

measuring the interparticular pore between the first particles by mercury intrusion porosimetry;

preparing second lithium transition metal oxide particles (second particles) having an average particle diameter within a range of a diameter of the interparticular pore; and mixing the first particles with the second particles.

8. A lithium secondary battery comprising the cathode active material according to claim 1.

* * * * *